United States Patent
Matsuyama et al.

(10) Patent No.: US 8,645,986 B2
(45) Date of Patent: Feb. 4, 2014

(54) CONTENTS WATCHING DEVICE AND CONTENTS RECOMMENDING METHOD

(75) Inventors: Satoshi Matsuyama, Osaka (JP); Hiroyuki Nakamura, Osaka (JP); Kenji Sakamoto, Osaka (JP); Jun Sasaki, Osaka (JP); Ryusuke Watanabe, Osaka (JP); Akio Uemichi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 559 days.

(21) Appl. No.: 12/740,982

(22) PCT Filed: Apr. 18, 2008

(86) PCT No.: PCT/JP2008/057581
§ 371 (c)(1),
(2), (4) Date: Aug. 23, 2010

(87) PCT Pub. No.: WO2009/060636
PCT Pub. Date: May 14, 2009

(65) Prior Publication Data
US 2010/0325648 A1    Dec. 23, 2010

(30) Foreign Application Priority Data
Nov. 6, 2007 (JP) ................................ 2007-289045

(51) Int. Cl.
*H04H 60/32* (2008.01)
(52) U.S. Cl.
USPC .............................................. 725/14; 725/46
(58) Field of Classification Search
USPC ................................................... 725/14, 46
See application file for complete search history.

(56) References Cited

U.S. PATENT DOCUMENTS

| 7,082,255 | B1 * | 7/2006 | Jun ................................ 386/291 |
| 7,971,217 | B2 * | 6/2011 | Masumitsu et al. ............ 725/46 |
| 2002/0075320 | A1 * | 6/2002 | Kurapati ........................ 345/811 |
| 2002/0095676 | A1 * | 7/2002 | Knee et al. ...................... 725/46 |
| 2003/0020744 | A1 * | 1/2003 | Ellis et al. ...................... 345/723 |
| 2005/0060743 | A1 | 3/2005 | Ohnuma et al. |

FOREIGN PATENT DOCUMENTS

| CN | 1593059 A | 3/2005 |
| JP | 2003-69912 A | 3/2003 |
| JP | 2004-206679 A | 7/2004 |
| JP | 2006-50662 A | 2/2006 |
| JP | 2006-94018 A | 4/2006 |

* cited by examiner

*Primary Examiner* — Pankaj Kumar
*Assistant Examiner* — Charles N Hicks
(74) *Attorney, Agent, or Firm* — Birch, Stewart, Kolasch & Birch, LLP

(57) ABSTRACT

A conventional contents-watching device, etc. calculate users' tastes of contents only on the basis of watching frequencies, so that variety programs that the users are less interested in but that are broadcasted every week are apt to get a higher degree of users' tastes than a soccer game of the Japanese national team that the users are highly interested in but that is broadcasted only several times per year. In order to solve the problem set forth above, the present invention proposes a contents-watching device that calculates a taste value by normalizing a watching index indicative of the number of contents-watching times or the like for every contents-attribute with an emergent index indicative of the number of contents-watching chances, acquires an contents-attribute connected with contents to be a subject for watching recommendation, and has a function to calculate watching recommendation information by using the taste value of the contents-attribute.

20 Claims, 25 Drawing Sheets

| (a) Conventional invention | Morning drama | Professional boxing title match |
|---|---|---|
| Number of viewings | 106 | 2 |
| Degree of preference | 1.06 | 0.02 |

| (b) Present invention | Morning drama | Professional boxing title match |
|---|---|---|
| Number of viewings | 106 | 2 |
| Number of broadcasts | 200 | 2 |
| Degree of preference | 0.53 | 1.00 |

Fig 1

| (a) Conventional invention | Morning drama | Professional boxing title match |
|---|---|---|
| Number of viewings | 106 | 2 |
| Degree of preference | 1.06 | 0.02 |

| (b) Present invention | Morning drama | Professional boxing title match |
|---|---|---|
| Number of viewings | 106 | 2 |
| Number of broadcasts | 200 | 2 |
| Degree of preference | 0.53 | 1.00 |

Fig 3

```
<Content attribute>
    <Content ID>              1A23B2007X4              </Content ID>
    <Title>                   World news A             </Title>
    <Cast>                    Taro Yamada              </Cast>
    <Genre>                   News                     </Genre>
    <Place>
        <Shooting>            ABC hall                 </Shooting>
        <Location>            Tokyo                    </Location>
    </Place>
    <Producer>                X broadcast network      </Producer>
    <Date and time of         2007/10/01               </Date and time of
    production>                                        production>
    <Sponsor>                 Y foods                  </Sponsor>
    <Language>                Japanese                 </Language>
         :                         :                         :
         :                         :                         :
</Content attribute>
```

Fig 4

```
<preference value>
  <Title>
     World news A              0.575
     The detective B case files  0.800
     Today's cooking C         0.250
              ⋮                   ⋮
  <Cast>
     Taro Yamada               0.350
     Johnny Tanaka             0.615
     Hanako Suzuki             0.235
              ⋮                   ⋮
  <Genre>
     News                      0.286
     Movie                     0.378
     Comedy                    0.432
              ⋮                   ⋮
```

Fig. 20

| Time zone | Constant multiplication |
|---|---|
| 0:00-3:00 | 2.0 |
| 3:00-6:00 | 1.5 |
| 6:00-9:00 | 1.0 |
| 9:00-12:00 | 1.5 |
| 12:00-15:00 | 1.0 |
| 15:00-18:00 | 1.5 |
| 18:00-21:00 | 1.0 |
| 21:00-24:00 | 1.0 |

CONTENTS WATCHING DEVICE AND CONTENTS RECOMMENDING METHOD

FIELD OF THE INVENTION

The present invention relates to a content viewer capable of automatically recommending content suitable to a user's preference or performing programmed-recording of content suitable to a user's preference.

BACKGROUND ART

Recently, content viewer that recommends content suitable to a user's (viewer or listener) preference utilizing information such as EPG (Electronic Program Guide) provided from TV broadcasting companies or radio stations is known.

For example, in the content viewer, a preference value in proportion to number of viewings is calculated with respect to each keyword of content attribute (e.g., title, genre, or cast) included in the information of the EPG, suitability of the content and the user's preference is calculated as the sum of preference values of the keyword included in the content, thereby recommending the content in the order of suitability.

Additionally, Japanese Unexamined Patent Application Publication No. 2004-206679 discloses a program recommending apparatus, in which user preference information is generated based on information on preference of a program whose number of viewings is above a threshold, and setting of programmed-recording of the program whose number of viewings is above a threshold is carried out.

Patent Reference 1: Japanese Unexamined Patent Application Publication No. 2004-206679

DISCLOSURE OF THE INVENTION

Problems that the Invention Tries to Solve

However, in these conventional apparatuses, since the user's preference of content is calculated simply based on the number of viewings, there is a possibility that the user's preference for the program having low viewing frequency and high occurrence frequency becomes higher than the program having low occurrence frequency and high viewing frequency.

For example, even if the user has a great deal of interest in fighting matches broadcast only a few times a year or football games of Japan's national team, the suitability for the user's preference becomes decrease than variety programs, broadcast every week and attracting a low level of interest.

In addition, also in the case of automatic recording by filtering programs using the method in Japanese Unexamined Patent Application Publication No. 2004-206679, the program, which is viewed at low frequency but is broadcast many times, is preferentially recorded, and the program, which has low occurrence frequency but is viewed every time, is missed.

Means for Solving the Problems

In order to solve the above deficiencies, the present invention provides, for example, a content viewer calculating a preference value by normalizing the viewing index by the occurrence index with respect to each content attribute, acquiring the content attribute associated with a content as a target in order to recommend viewing the content, and calculating information of view-recommendation by utilizing the acquired preference value.

Effects of the Invention

According to the content viewer of the present invention, it is possible to calculate the information of view-recommendation based on the preference value by normalizing the viewing index by the occurrence index, thereby recommending the content, which is possibly viewed at higher frequency by the user and better suits the user's preference. Therefore, for example, in the case of the content, which is broadcast at low frequency but is viewed by the user every time, it is possible to recommend the user view the content as the content suiting the user's preference.

BRIEF DESCRIPTION OF THE DRAWINGS

FIG. 1 is a diagram showing the difference between the conventional calculation method for suitability or content attribute and user's preference and a calculation method of a content viewer of a first embodiment.

FIG. 3 is a diagram exemplifying data of content attribute group for content viewed by the content viewer of the first embodiment.

FIG. 4 is a diagram exemplifying data of preference values stored in the storage for preference value of the content viewer of the first embodiment.

FIG. 20 is a table for assigning weight according to viewing time slot upon calculating the preference value by the content viewer of the sixth embodiment.

DESCRIPTION OF REFERENCE NUMERALS

0100 Content viewer
0101 Acquirer for viewing index
0102 Acquirer for occurrence index
0103 Calculator for preference value
0104 Storage for preference value
0105 Calculator for information of view-recommendation

DETAILED DESCRIPTION OF THE INVENTION

The first embodiment will mainly describe claims 1 and 8. The second embodiment will mainly describe claim 2. The third embodiment will mainly describe claim 3. The fourth embodiment will mainly describe claim 4. The fifth embodiment will mainly describe claim 5. The sixth embodiment will mainly describe claim 6. The seventh embodiment will mainly describe claim 7. Embodiments of the present invention will be described hereinbelow with reference to the drawings. The present invention is not to be limited to the above embodiments and able to be embodied in various forms without departing from the scope thereof.

<<First Embodiment>>
<Concept of First Embodiment>

A content viewer of a first embodiment determines user's preference with respect to each content attribute. Specifically, even in the case of the content, which is broadcast at low frequency and is viewed at low frequency, determination as close to the user's preference as possible can be carried out. FIG. 1 is a diagram showing the difference between the conventional calculation method for suitability of content attribute and user's preference and a calculation method of the content viewer of the first embodiment. For example, in the conventional method of FIG. 1(*a*), the professional boxing title match, which the user likes very much, has been broadcast only twice in the last year, so that the user's preference becomes decrease than the user's preference for the morning drama, which the user tunes in upon waking up to check the clock. The reason for this is that the drama has been viewed 106 times in the last year. In FIG. 1(*a*), the degree of preference of the morning drama is 1.06 and that of the professional boxing title match is 0.02. Meanwhile, in the present invention of FIG. 1(*b*), the professional boxing title match has been viewed twice in the last year without missing it, so that the viewing rate (the degree of preference) thereof is 100%. The morning drama has been viewed 106 times of 200 broadcasts because the user has sometimes tuned in other news channels, so that the viewing rate (the degree of preference) thereof is only 53%. According to the present invention, the user's degree of preference is 100%>53%, so that the user's degree of preference for the professional boxing title match can be calculated as a higher value. In FIG. 1, the degree of preference of the morning drama is calculated to be 0.53, and the degree of preference of the professional boxing title match is calculated to be 1.00.

<Configuration of First Embodiment>

Figure 2:
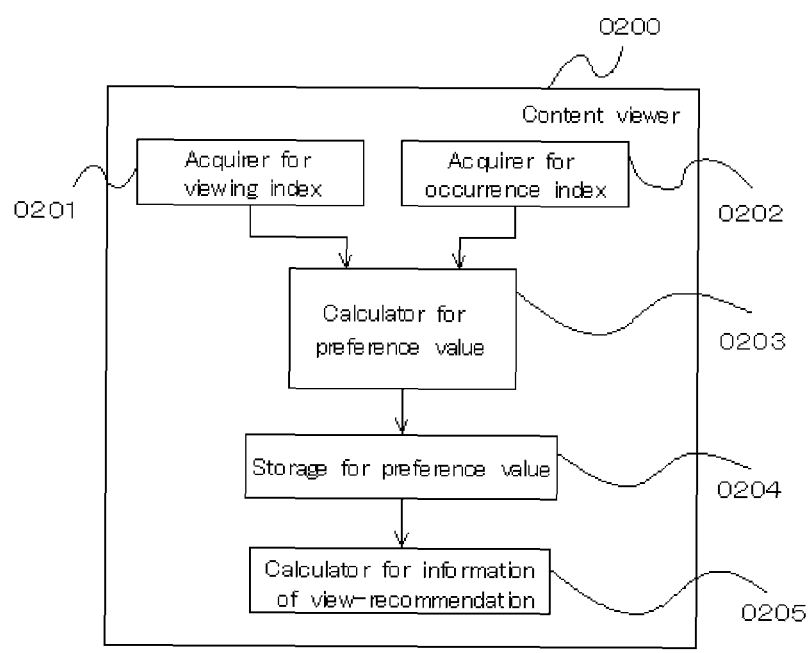
FIG. 2 is a functional block diagram of the content viewer of the first embodiment.

FIG. 2 is a functional block diagram of the content viewer of the first embodiment. In FIG. 2, a 'content viewer' 0200 of the first embodiment comprises an 'acquirer for viewing index' 0201, an 'acquirer for occurrence index' 0202, a 'calculator for preference value' 0203, a 'storage for preference value' 0204, and a 'calculator for information of view-recommendation' 0205. Moreover, the present invention can be implemented not only as an apparatus but also as a method (the same applies throughout the entire specification).

The 'acquirer for viewing index' is configured to acquire a viewing index indicating frequency of viewing content. The 'viewing index' is an index indicating the level of user's willingness of viewing the content. Upon determining the viewing index, number of recordings, date and time of viewings, or reproduction time of the content in addition to the number of viewings, content can be utilized. As the method for determining the viewing index, for example, if a predetermined time period elapses from the start of viewing the content, the viewing index of 0.5 is given to the content, and if the content is viewed to the end, the viewing index of 1.0 is given to the content. Additionally, if the viewing time of the content is more than 2 hours, the viewing index of 1.5 is given to the content.

The 'acquirer for occurrence index' is configured to acquire an occurrence index indicating frequency of chances for viewing the content. The 'number of chances of viewing' indicates number of events as motivators of the user to view the content. For example, in the case of the content broadcast on the general television, the number of chances of viewing corresponds to the number of broadcasts of the content, and in the case of the content distributed by VOD (Video On Demand), it corresponds to the number of days where the content was displayed on a screen for selecting viewable contents. Additionally, when viewing of a certain content is restricted, the user, who was not allowed to view the content, had no chance to view the content. When determining the 'occurrence index', the viewing rate of the date and time where the content was broadcast, presence of view-restriction, number of viewings or number of occurrences in the past can be utilized in addition to the number of chances of viewing. For example, when the content has been broadcast once, the occurrence index 1.0 is acquired, and when the same content has been viewed in the past, the user's motivation to view the content decreases, so that the occurrence index 0.50 is acquired. Additionally, when the content has been broadcast after midnight, the time slot having a low viewing rate, generally, the chance of viewing by the user is small, so that the occurrence index 0.25 may be acquired. Note that, depending on the method for determining the number of chances of viewing etc., there is a case that the content is viewed and the viewing index is added even if the occurrence index is not added. In such a case, it is possible to add the same value of the viewing index and the occurrence index.

Note that, depending on the method for determining the number of chances of viewing etc., there is a case that the content is viewed and the viewing index is added even if the occurrence index is not added. In such a case, it is possible to simultaneously add the same value to the viewing index and the occurrence index.

The 'calculator for preference value' is configured to calculate a preference value by normalizing the viewing index by the occurrence index with respect to each content attribute. FIG. 3 is a diagram exemplifying data of content attribute group for content viewed by the content viewer. In this case, the content attribute includes content ID, cast, genre, location, producer, production date, sponsor, language etc. Specifically, information such as <title> world news A, <cast> Taro Yamada, and <genre> news, is described as the content attribute information of the content having <content ID>1A23B2007XA.

In FIG. 2, the 'storage for preference value' is configured to associate the calculated preference value with the content attribute, and storing the preference value associated with the content attribute. FIG. 4 is a diagram exemplifying data of preference values stored in the storage for preference value of the content viewer. In this case, the preference value of 'world news A' included in the attribute <title> is 0.575, and 'Taro Yamada' included in the attribute <cast> is 0.350. The storage for preference value can store the viewing index and the occurrence index, which are used for calculating the preference value, as the preference value information in addition to these preference values. For example, as the preference value of 'world news A' included in the attribute <title>, the viewing index 1150 and the occurrence index 2000 may be stored in addition to the preference value 0.575.

In FIG. 2, the 'calculator for information of view-recommendation' is configured to acquire the content attribute associated with a content as a target in order to recommend viewing the content, acquiring the preference value stored in the storage for preference value by utilizing the content attribute as a key, and calculating information of view-recommendation by utilizing the acquired preference value. The term 'to recommend viewing' means extraction of the content from a group of contents based on a predetermined condition, and some sort of motivation for the user to view the content. For example, a viewing list of the content suiting the user's preference may be displayed on the screen, automatic recording may be carried out, or the content viewer may be automatically powered-on at the start of broadcasting the content.

The 'content attribute associated with the content' corresponds, for example, to the content attribute included in XML data of the content in FIG. 3. The terms 'acquiring the preference value stored in the storage for preference value by utilizing the content attribute as a key' means that, for example, the preference value 0.575 of 'world news A' included in the attribute <title>, the preference value 0.350 of 'Taro Yamada' included in the attribute <cast>, and the preference value 0.286 of 'news' included in the attribute <genre> are acquired from the preference values in FIG. 4. Here, if the preference values of all content attributes are not always stored in the storage for preference value, a part of preference values of the content attributes associated with the content can be acquired.

Here, an example of calculation method for the information of view-recommendation utilizing the preference value is cited. For example, a method for calculating the total sum of the preference values of the content attributes with respect to each content may be used. In addition, if the preference value of the content attribute is more than a predetermined value, weighting of the preference value may be done, in which the preference value is added after being constant-multiplied, upon calculating the total sum of the preference values. Moreover, in the case of a configuration, in which the storage for preference value stores the viewing index and the occurrence index as the preference value information, if the occurrence index is less than or equal to a standard value, the above weighting may not be executed upon calculating the total sum of the preference values even if the preference values more than or equal to the predetermined value. Moreover, the predetermined value or the value of constant-multiplication etc. may be determined by the user himself.

<Concrete Configuration of First Embodiment>

Figure 5:
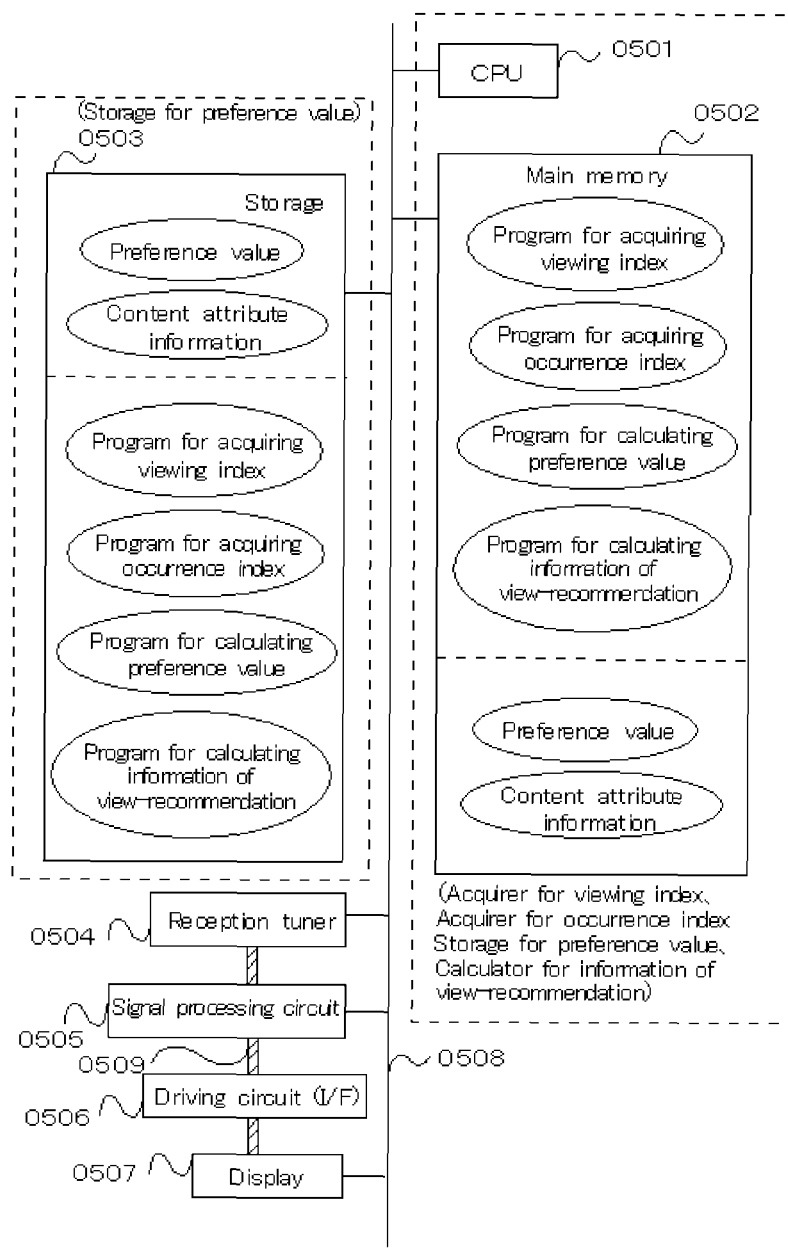
FIG. 5 is a schematic diagram showing an example of a hardware configuration of the content viewer of the first embodiment.

Subsequently, the respective hardware configurations of the content viewer of the first embodiment will be described. FIG. 5 is a schematic diagram showing an example of a hardware configuration of the content viewer of the first embodiment. As shown in FIG. 5, the acquirer for viewing index, the acquirer for occurrence index, the calculator for preference value and the calculator for information of view-recommendation comprise a 'CPU' 0501 and a 'main memory' 0502. In addition, the storage for preference value comprises 'storage (or storage medium)' (0503). Moreover, a 'reception tuner' 0504 receiving image signal of the content broadcast and information regarding the content attribute, a 'signal processing circuit' 0505 converting the image signals of the content broadcast to information viewable by the content viewer, a 'driving circuit' 0506 performing electronic control and driving of a screen display, and a 'display' 0507 for displaying the content broadcast or reproduced, or a view-recommendation list. These are mutually connected through the data communication path of a 'system bus' 0508, thereby carrying out transmission/reception and processing of the information. Additionally, the image signal from the reception tuner to the display is transmitted through an 'image signal line' 0509.

The storage stores various programs executed by the CPU. The main memory provides work area used upon execution of the programs by the CPU. In addition, a plurality of memory addresses are assigned to the main memory and the storage respectively, so that the program executed by the CPU specifies the memory address and accesses thereto, thereby mutually exchanging data and carrying out processing. Moreover, in the description below, although the program is preliminarily developed and resident in the work area of the main memory, it is possible to call the program from the storage as necessary.

The program for acquiring the occurrence index, for example, when determining appearance of the content based on the electronic program information such as EPG stored in the storage, extracts the content attribute associated with the content. Subsequently, the current information of the occurrence index of each content attribute is acquired from the storage, the numerical data is stored in a predetermined area in the memory, and addition computation for the occurrence index is executed, thereby acquiring new occurrence index. Additionally, the program for acquiring the viewing index, when the image signal of the content has been outputted from the driving circuit to the display, determines that content has been viewed, thereby extracting the content attribute associated with the content. Subsequently, the current information of the viewing index of each content attribute is acquired from the storage, the numerical data is stored in a predetermined area in the memory, and addition computation for the viewing index is executed, thereby acquiring new viewing index.

Subsequently, the program for calculating the preference value, when determining that the viewing index or the occurrence index of the content attribute stored in the storage has been updated, acquires the viewing index and the occurrence index of the content attribute from the storage, and stores the numerical data in a predetermined area in the memory. After that, a calculation to normalize the viewing index by the occurrence index is executed, thereby calculating a new preference value.

Moreover, the program for calculating the information of view-recommendation, when determination is made based on the electronic program information such as EPG stored in the storage that there is the content, whose information of view-recommendation is to be calculated, acquires the preference value of the content attribute associated with the content from the storage for preference value in the storage, and stores the numerical data in a predetermined area in the memory, thereby executing addition calculation of the preference value with respect to each content.

<Processing Flow of First Embodiment>

Figure 6:
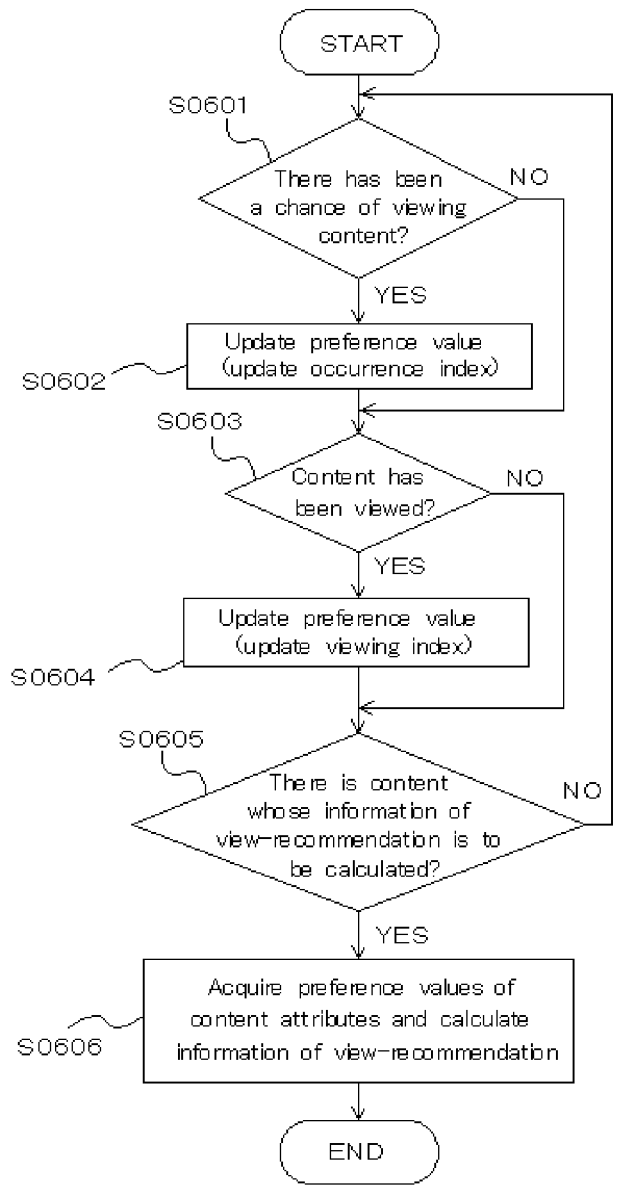
FIG. 6 is a flowchart showing processes in the content viewer of the first embodiment.

FIG. 6 is a flowchart showing processes in the content viewer of the first embodiment. The processes in FIG. 6 include the following steps. At the outset, in step S0601, it is determined whether there has been a chance to view the content. Here, if it is determined that there has been a chance to view the content, step S0602 is carried out. If it is determined that there has not been a chance to view the content, step S0603 is carried out. This processing is mainly carried out by the acquirer for occurrence index. In step S0602, the preference value is calculated based on the occurrence index updated by the acquirer for occurrence index, thereby updating the preference value. This processing is mainly carried out by the calculator for preference value. In step S0603, it is determined whether the content has been viewed. Here, if it is determined that the content has been viewed, step S0604 is carried out. If it is determined that the content has not been viewed, step S0605 is carried out. This processing is mainly carried out by the acquirer for viewing index. In step S0604, the preference value is calculated based on the viewing index updated by the acquirer for viewing index, thereby updating the preference value. This processing is mainly carried out by the calculator for preference value. In step S0605, it is determined whether there is the content, whose information of view-recommendation is to be calculated. Here, if it is determined that there is the content, step S0606 is carried out. If it is determined that there is no content, the processing returns to step S0601. In step S0606, the information of view-recommendation is calculated based on the information of the content attribute and the preference value with respect to each content. This processing is mainly carried out by the calculator for information of view-recommendation.

The above processes can be executed by the program to cause a computer to execute, and the program can be recorded in a recording medium readable by the computer (the same applies to the entire specification).

<Brief Description of Effects of First Embodiment>

According to the content viewer of the first embodiment, it is possible to calculate the information of view-recommendation based on the preference value of each content attribute, acquired by normalizing the viewing index by the occurrence index, thereby recommending the content, which has a high possibility of being viewed by the user, and better suits the user's preference. This makes it possible to recommend the user to view the content, which suits the user's preference, for example, when the number of broadcasts of the content is small but the user has viewed the content without fail.

<<Second Embodiment>>

<Concept of Second Embodiment>

A content viewer of a second embodiment is basically the same as that of the first embodiment, and is different in comprising a display for list displaying a list of viewable contents, and in that number of displays of the content ID by the display for list is used as the number of chances of viewing.

<Configuration of Second Embodiment>

Figure 7:
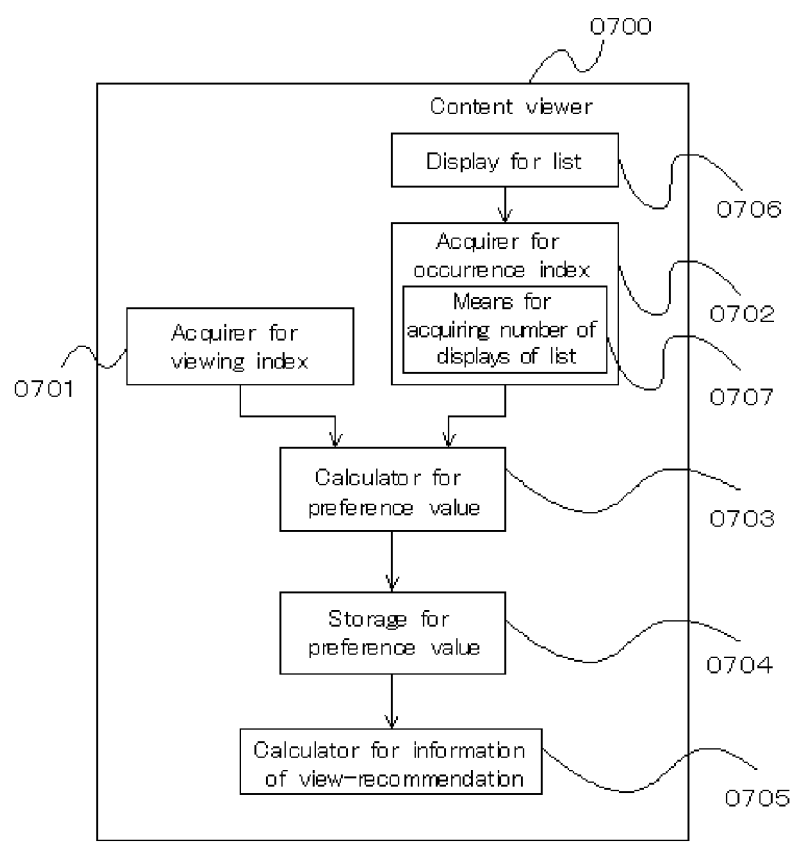
FIG. 7 is a functional block diagram of the content viewer of a second embodiment.

FIG. 7 is a functional block diagram of the content viewer of the second embodiment. A 'content viewer' 0700 of the second embodiment comprises an 'acquirer for viewing index' 0701, a 'acquirer for occurrence index' 0702, a 'calculator for preference value' 0703, a 'storage for preference value' 0704, and a 'calculator for information of view-recommendation' 0705, and a display for list 0706. The 'acquirer for occurrence index' further comprises 'means for acquiring number of displays of the list' 0707.

The 'display for list' is configured to display a list of viewable contents. The 'viewable contents' are contents which the user can view by the content viewer. Examples of the content include, content internally stored in the content viewer as data, content acquired from an electronic apparatus connected with the content viewer, content receivable through an antenna etc, and content on the network acquired through telecommunication line. Additionally, the content having view-restriction or the content, which requires registration for viewing, may not be included as the viewable content even if such contents are included in the above viewable contents. The 'means for acquiring number of displays of the list' acquires the number of displays of the list, which is the number of displays of the list of the content ID as the number of chances of viewing by the display for list. Here, the number of displays of list may be extracted with respect to each content ID, thereby being acquired, or may be extracted with respect to each content attribute, thereby being acquired. For example, when the same content attribute (e.g., cast or genre) is included in a plurality of contents having different content IDs, the total sum of the number of displays of list of the plurality of contents included in the content attribute may be calculated, thereby acquiring the number of displays of list of the content attribute. Moreover, among the content IDs, it is possible to execute addition operation of the number of displays of list of only the content ID, which has been displayed in a viewable state on the display screen. For example, when many content IDs are included in the list, and all of them cannot be displayed once on the display screen, it is possible to execute addition operation of the number of displays of list of only the content ID, which has been viewed by the user through the user's operation. Note that, in replacement of the content ID, number of displays of the content title can be used as the number of displays of list. When the user views the content not included in the list, the viewing index and the occurrence index of the content attribute associated with the content can be added together <Concrete Configuration of Second Embodiment>

Figure 8:
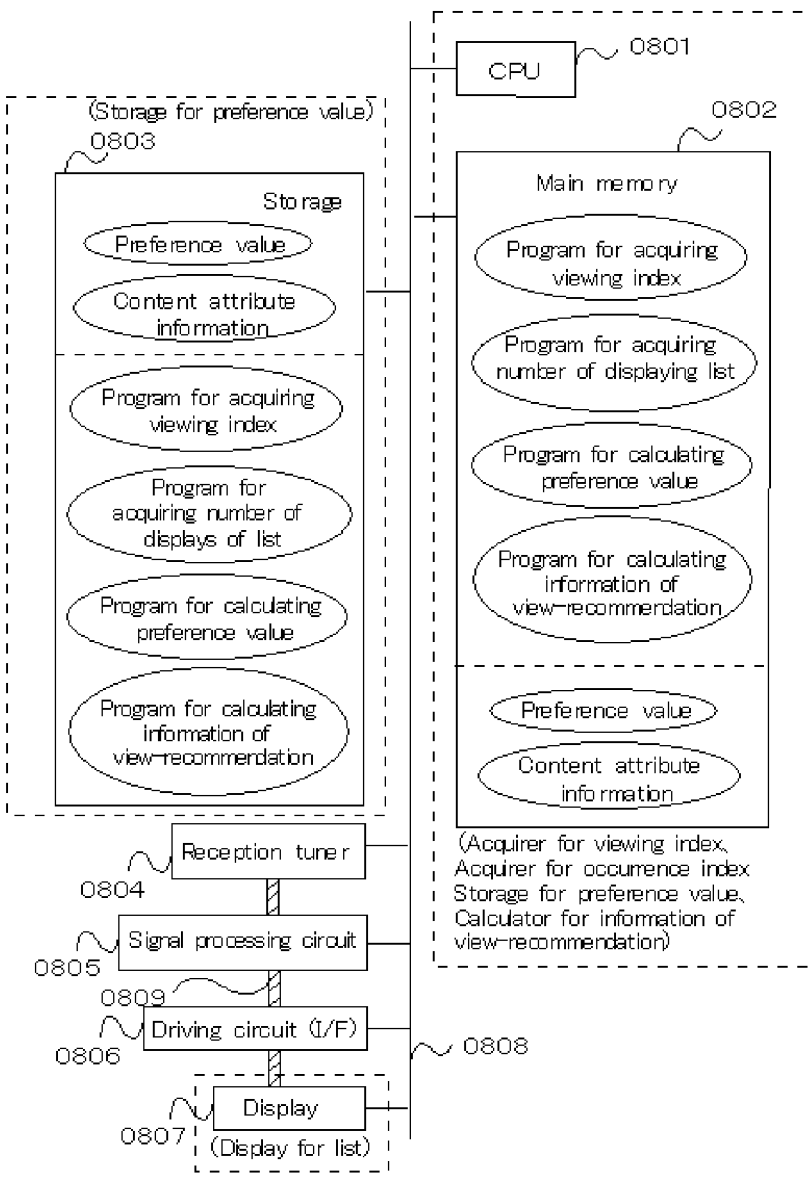
FIG. 8 is a schematic diagram showing an example of a hardware configuration of the content viewer of the second embodiment.

FIG. 8 is a schematic diagram showing an example of a hardware configuration of the content viewer of the second embodiment. The configuration is basically the same as that of the apparatus of the first embodiment described with reference to FIG. 5. However, in the apparatus of the second embodiment, the display has a function of the display for list, and has a program for acquiring number of displays of list as one of the programs for acquiring occurrence index. The program for acquiring number of displays of list, for example, when it is determined that the image signal of the content list is outputted from the driving circuit to the display, extracts the content attribute associated with the content from the electronic program guide such as EPG as the content list stored in the storage. Subsequently, the current information of the number of displays of list of each content attribute is acquired from the storage, the numerical data in a predetermined area in the memory is stored, thereby executing addition calculation for the number of displays of list, and storing it as a new occurrence index in the storage. Other concrete configurations are the same as those of the content viewer of the first embodiment, so that descriptions are omitted.

<Processing Flow of Second Embodiment>

Figure 9:
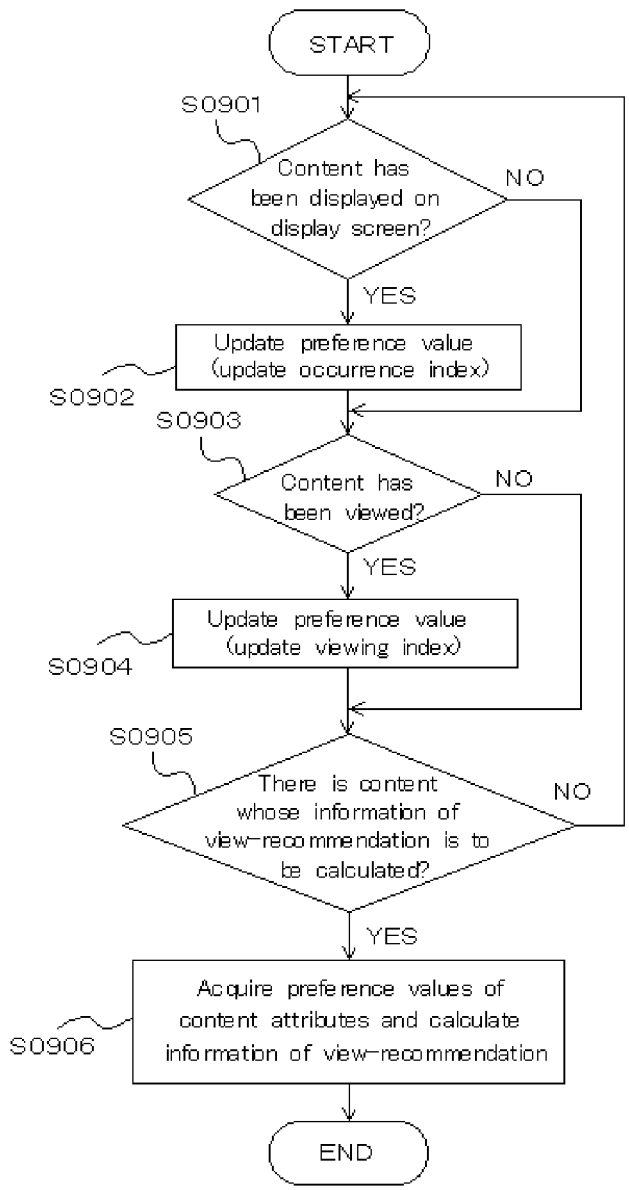
FIG. 9 is a flowchart showing processes in the content viewer of the second embodiment.

FIG. 9 is a flowchart showing processes in the content viewer of the second embodiment. At the outset, in step S0901, it is determined whether the content has been displayed as viewable content on the display for list. Here, if it is determined that the content has been displayed, a step S0902 is carried out. If it is determined that the content has been displayed, step S0903 is carried out. This processing is mainly carried out by the acquirer for occurrence index. In 3 step S0902, the preference value is calculated based on the occurrence index updated by the acquirer for occurrence index, thereby updating the preference value. This processing is mainly carried out by the calculator for preference value. Other processes are the same as those in the content viewer of the first embodiment, so that descriptions are omitted.

<Brief Description of Effects of Second Embodiment>

According to the content viewer of the second embodiment, unnecessary addition operation of the occurrence index of the content attribute for the content, whose content ID has not been displayed on the display for list, so that the user could not have a chance to view it, is not executed. Therefore, it is possible to acquire a more accurate occurrence index. According to the content viewer of the second embodiment, it is possible to calculate the information of view-recommendation based on the preference value acquired by normalizing the viewing index by the occurrence index, thereby recommending the content, which has a high possibility of being viewed by the user, and better suits the user's preference.

<<Third Embodiment>>

<Concept of Third Embodiment>

A content viewer of a third embodiment is basically the same as that of the first or second embodiment, and is different in that the acquirer for occurrence index further comprises means for acquiring number of calculations of the information of view-recommendation of the content by the calculator for information of view-recommendation as number of chances of viewing.

<Configuration of Third Embodiment>

Figure 10:
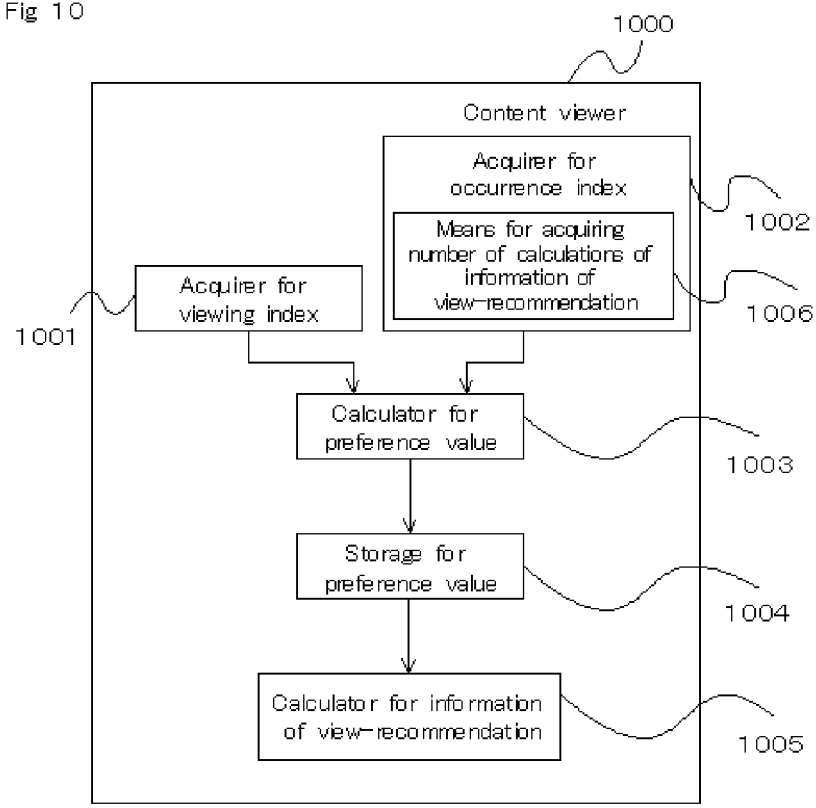
FIG. 10 is a functional block diagram of the content viewer of a third embodiment.

FIG. 10 is a functional block diagram of the content viewer of the third embodiment. A 'content viewer' 1000 of the second embodiment comprises an 'acquirer for viewing index' 1001, an 'acquirer for occurrence index' 1002, a 'calculator for preference value' 1003, a 'storage for preference value' 1004, and a 'calculator for information of view-recommendation' 1005, and the 'acquirer for occurrence index' comprises 'means for acquiring number of calculations of the information of view-recommendation' 1006.

The 'means for acquiring number of calculations of the information of view-recommendation' acquires the number of calculations of the information of view-recommendation of the content by the calculator for information of view-recommendation as the number of chances of viewing. Here, the number of calculations of the information of view-recommendation may be extracted with respect to each content ID and acquired, or may be extracted with respect to each other content attribute and acquired. For example, when the same content attribute (e.g., cast or genre) is included in a plurality of contents having different content IDs, the total sum of the number of calculations of the information of view-recommendation of the plurality of contents included in the content attribute may be calculated, thereby acquiring the number of calculations of the information of view-recommendation of the content attribute. Moreover, when the user views the content, whose information of view-recommendation has not been calculated, the viewing index and the occurrence index of the content attribute associated with the content can be added together. Moreover, when the user instructs to calculate the information of view-recommendation, since a new chance of viewing the content arises due to the information updated by the instruction, the number of chances of viewing can be acquired. In addition when re-calculation of the information of view-recommendation is executed for the same content, since the content is possibly displayed again on the display screen as the information of view-recommendation, it is possible to acquire the new number of chances of viewing for the re-calculation of the information of view-recommendation. Other configurations are the same as those of the content viewer of the first or second embodiment, so that descriptions are omitted.

<Concrete Configuration of Third Embodiment>

Figure 11:
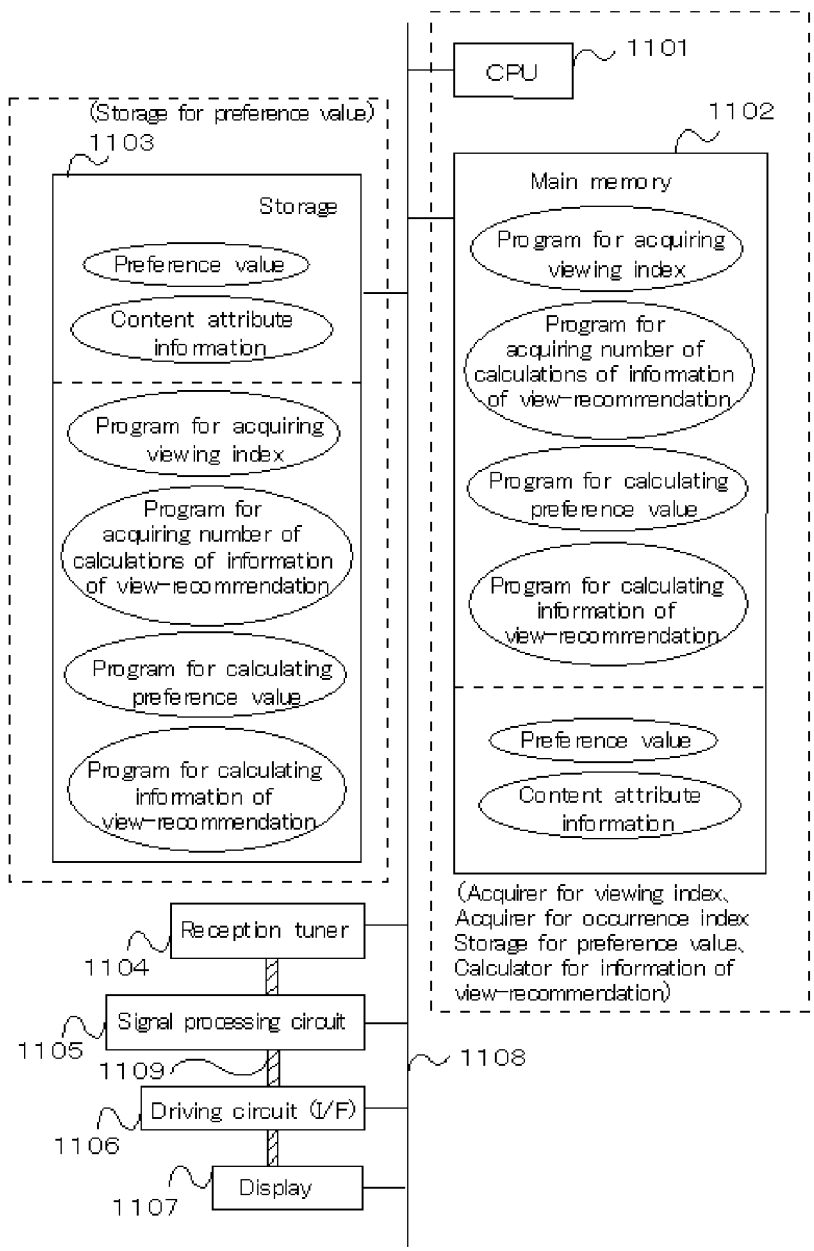
FIG. 11 is a schematic diagram showing an example of a hardware configuration of the content viewer of the third embodiment.

FIG. 11 is a schematic diagram showing an example of a hardware configuration of the content viewer of the third embodiment. The configuration is basically same as that of the apparatus of the first embodiment described with reference to FIG. 5. However, the apparatus of the third embodiment has a program for acquiring number of calculations of the information of view-recommendation as one of the program for acquiring occurrence index. The program for acquiring number of calculations of the information of view-recommendation, for example, when it is determined that the calculation of the information of view-recommendation of the content has been executed in the CPU, extracts the content attribute associated with the content from the electronic program guide such as EPG as the content list stored in the storage. Subsequently, the current information of the number of calculations of the information of view-recommendation of each content attribute is acquired from the storage, the numerical data in a predetermined area in the memory is stored, thereby executing addition calculation for value of the number of calculations of the information of view-recommendation, and storing it as a new occurrence index in the storage. Other concrete configurations are the same as those of the content viewer of the first embodiment, so that descriptions are omitted.

<Processing Flow of Third Embodiment>

Figure 12:
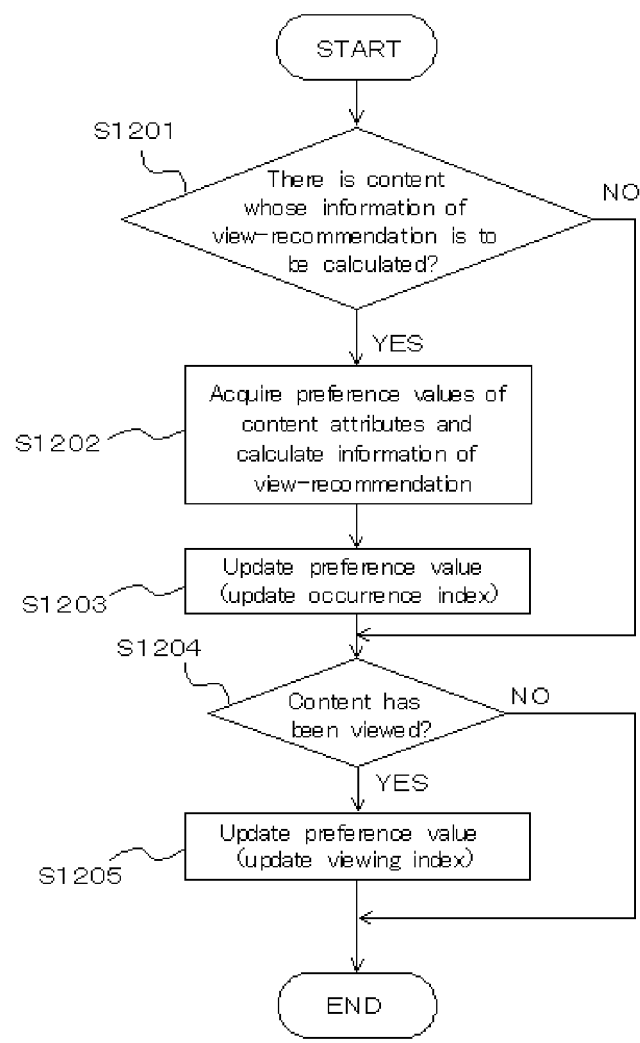
FIG. 12 is a flowchart showing processes in the content viewer of the third embodiment.

FIG. 12 is a flowchart showing processes in the content viewer of the third embodiment. At the outset, in step S1201, it is determined whether there is the content, whose information of view-recommendation is to be calculated. Here, if it is determined that there is the content, whose information of view-recommendation is to be calculated, step S1202 is carried out. If it is determined that there is not the content, whose information of view-recommendation is to be calculated, step S1204 is carried out. In step S1202, the information of view-recommendation is calculated. This processing is mainly carried out by the calculator for information of view-recommendation. In step S1203, the preference value is calculated based on the occurrence index updated by the acquirer for occurrence index, thereby updating the preference value. This processing is mainly carried out by the calculator for preference value. Here, if it is determined that the content has been viewed, step S1205 is carried out. If it is determined that the content has not been viewed, processing is terminated. This processing is mainly carried out by the acquirer for viewing index. In step S1205, the preference value is calculated based on the viewing index updated by the acquirer for viewing index, thereby updating the preference value. This processing is mainly carried out by the calculator for preference value.

<Brief Description of Effects of Third Embodiment>

According to the content viewer of the third embodiment, unnecessary addition operation of the occurrence index of the content attribute for the content, which is not determined to suit the user's preference, is not executed. Therefore, it is possible to acquire more accurate occurrence index. According to the content viewer of the third embodiment, it is possible to calculate the information of view-recommendation based on the preference value acquired by normalizing the viewing index by the occurrence index, thereby recommending the content, which has high possibility of being viewed by the user, and better suits the user's preference.

<<Fourth Embodiment>>

<Concept of Fourth Embodiment>

A content viewer of a fourth embodiment is basically the same as that of any one of the first to third embodiments, and is different in comprising an acquirer for history of user's operations, which acquires a history of user's operations for viewing, and in that the acquirer for viewing index further comprises means for calculating the viewing index based on the acquired history of user's operations.

<Configuration of Fourth Embodiment>

Figure 13:
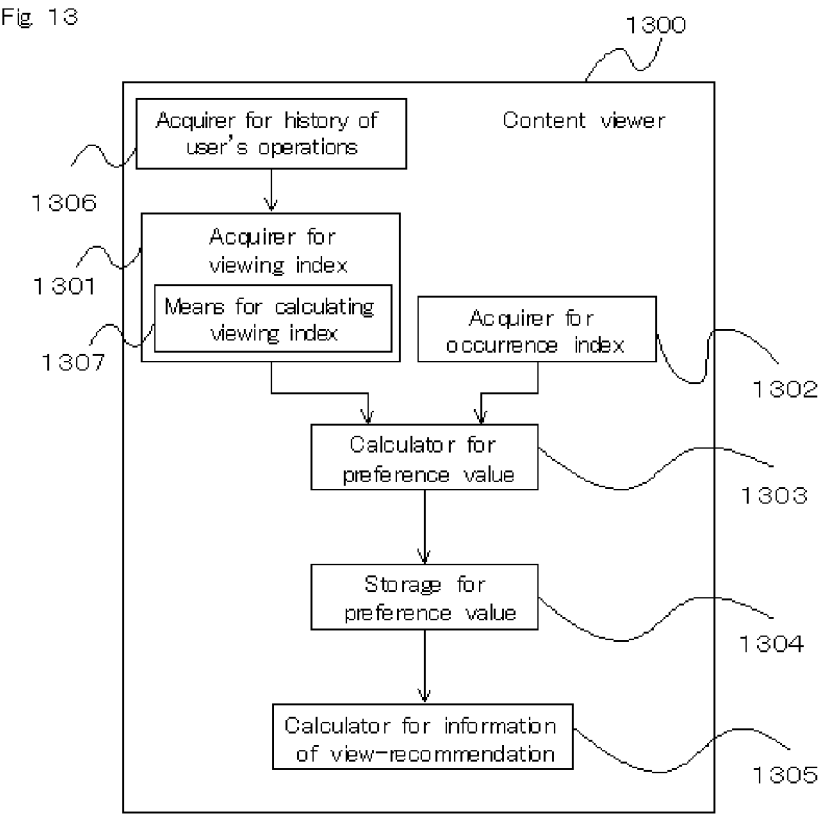
FIG. 13 is a functional block diagram of the content viewer of a fourth embodiment.

FIG. 13 is a functional block diagram of the content viewer of the fourth embodiment. A 'content viewer' 1300 of the second embodiment comprises an 'acquirer for viewing index' 1301, an 'acquirer for occurrence index' 1302, a 'calculator for preference value' 1303, a 'storage for preference value' 1304, and a 'calculator for information of view-recommendation' 1305, and an 'acquirer for history of user's operations' 1306. The acquirer for viewing index comprises 'means for calculating viewing index' 1307.

The 'acquirer for history of user's operations' is configured to acquire a history of user's operations for viewing. Here, examples of the 'history of user's operations for viewing' include information of selection or recording for viewing the content, date and time of operation, and viewing time-slot. The 'means for calculating viewing index' is for calculating the viewing index based on the acquired history of user's operations. In the means for calculating viewing index, for example, when a predetermined time (e.g., 10 min) elapses from the selection operation for viewing the content, it is determined that the user wishes to continuingly view the content, so that the viewing index 0.5 is calculated, and if he views the content to the end, the viewing index 1.0 is calculated. In addition, when carrying out the operation after a predetermined time (e.g., 1 week) elapses, it is determined that the user strongly wishes to view the content, the viewing index 1.5 may be calculated by weighting. On the other hand, the viewing index 0.5 may be given to the recording operation. Other configurations are the same as those of the content viewer of any one of the first to third embodiments, so that descriptions are omitted.

<Concrete Configuration of Fourth Embodiment>

Figure 14:
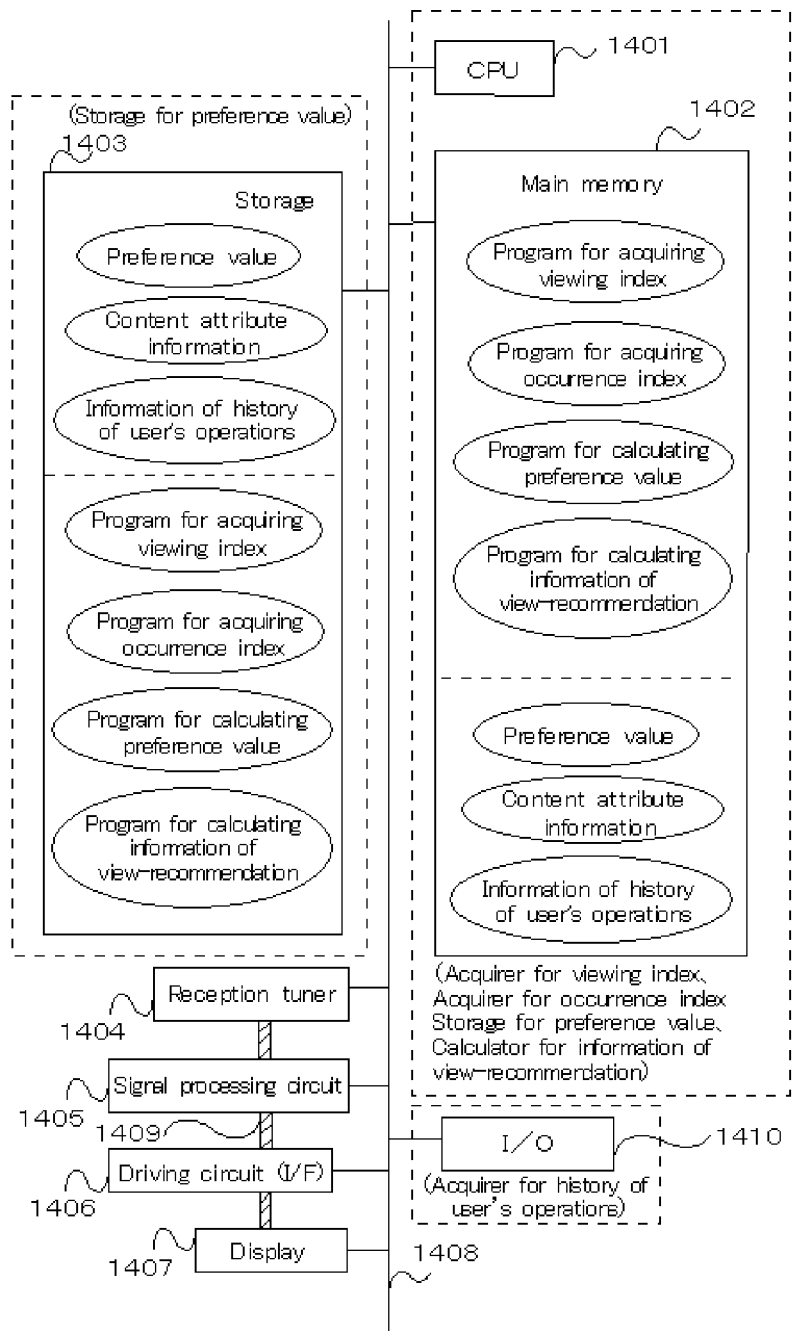
FIG. 14 is a schematic diagram showing an example of a hardware configuration of the content viewer of the fourth embodiment.

FIG. 14 is a schematic diagram showing an example of a hardware configuration of the content viewer of the third embodiment. The configuration is basically the same as that of the apparatus of the first embodiment described with reference to FIG. 5. However, the apparatus of the fourth embodiment comprises an 'I/O' 1410 as the acquirer for history of user's operations, and has a program for calculating viewing index as one of the program for acquiring occurrence index. When the user executes operation for viewing the content through the I/O, information of the operation is transmitted to the storage, thereby updating the information of history of user's operations stored in the storage. Subsequently, the program for calculating viewing index extracts the content attribute associated with the content, for which the user has done the operation for viewing, from the electronic program guide such as EPG as the content list stored in the storage. Subsequently, the current information of the viewing index and the operation history of each content attribute are acquired from the storage, the numerical data in a predetermined area in the memory is stored, thereby executing calculation for new viewing index. Other concrete configurations are the same as those of the content viewer of the first embodiment, so that descriptions are omitted.

<Processing Flow of Fourth Embodiment>

Figure 15:
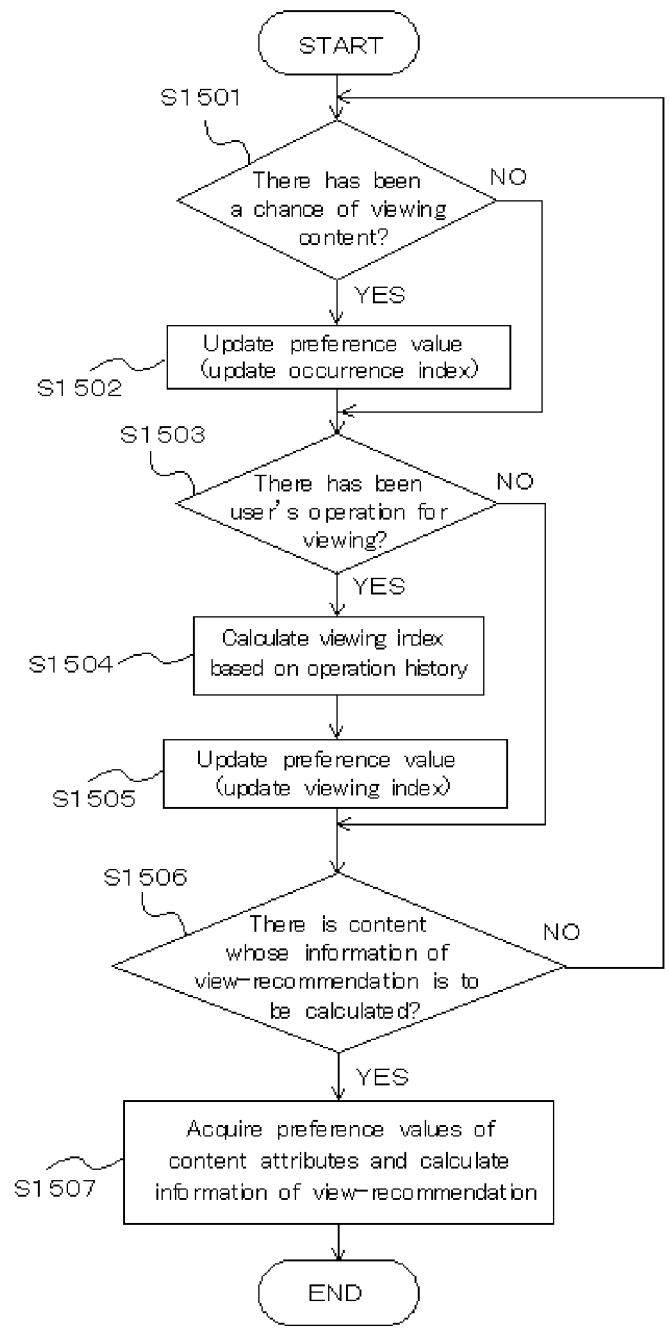
FIG. 15 is a flowchart showing processes in the content viewer of the fourth embodiment.

FIG. 15 is a flowchart showing processes in the content viewer of the fourth embodiment. At the outset, in step S1503, it is determined whether there has been the user's operation for viewing. Here, if it is determined that there has been the user's operation, step S1504 is carried out. If it is determined that there has not been the user's operation, step S1505 is carried out. This processing is mainly carried out by the acquirer for history of user's operations. In step S1504, the preference value is calculated based on the history of user's operations. This processing is mainly carried out by the calculator for viewing index. In step S1505, the preference value is calculated based on the viewing index updated by the acquirer for viewing index, thereby updating the preference value. This processing is mainly carried out by the calculator for preference value. Other processes are the same as those in the content viewer of any one of the first to third embodiments, so that descriptions are omitted.

<Brief Description of Effects of Fourth Embodiment>

According to the content viewer of the fourth embodiment, it is possible to calculate the viewing index from the history of user's operations for viewing, and to acquire more accurate occurrence index. Therefore, it is possible to calculate the information of view-recommendation based on the preference value acquired by normalizing the viewing index by the occurrence index, thereby recommending the content, which has a high possibility of being viewed by the user, and better suits the user's preference.

<<Fifth Embodiment>>

<Concept of Fifth Embodiment>

A content viewer of a fifth embodiment is basically the same as that of any one of the first to fourth embodiments, and is different in that the calculator for preference value comprises means for decreasing the preference value with passage of time from the latest viewing of the content having the content attribute associated with the preference value upon calculating the preference value, and the storage for preference value comprises means for deleting information on the preference value having a value less than or equal to a predetermined value as a result of the decrease of the preference value by the means for decreasing.

<Configuration of Fifth Embodiment>

Figure 16:
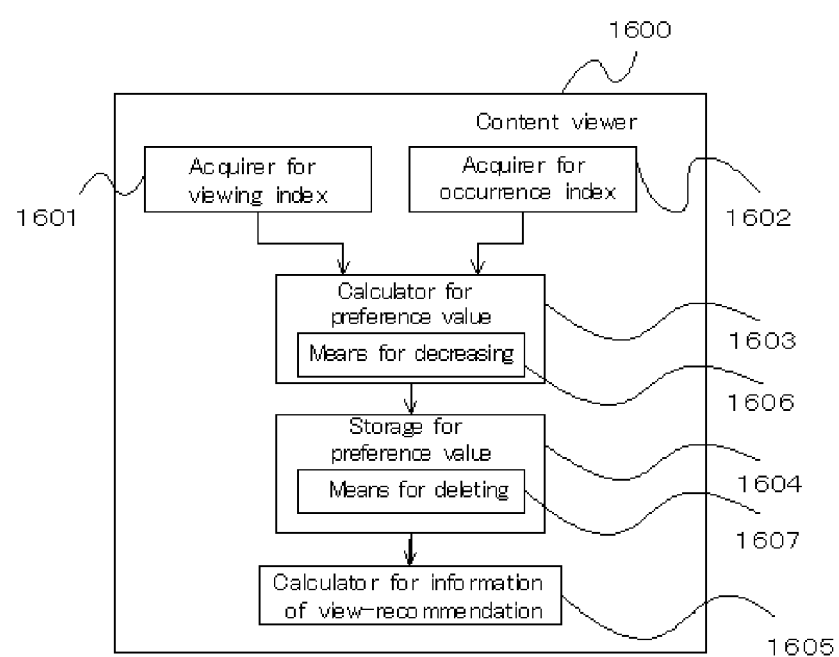
FIG. 16 is a functional block diagram of the content viewer of a fifth embodiment.

FIG. 16 is a functional block diagram of the content viewer of the fifth embodiment. A 'content viewer' 1600 of the fifth embodiment comprises an 'acquirer for viewing index' 1601, an 'acquirer for occurrence index' 1602, a 'calculator for preference value' 1603, a 'storage for preference value' 1604, and a 'calculator for information of view-recommendation' 1605, and the calculator for preference value comprises 'means for decreasing' 1606 and the storage for preference value comprises 'means for deleting' 1607.

The 'means for decreasing' is for decreasing the preference value with passage of time from the latest viewing of the content having the content attribute associated with the preference value upon calculating the preference value. In this case, various methods may be used for decreasing the preference value of the content attribute with passage of time. For example, a linear function or an exponential function, having the passage of time as a variable, may be used for decreasing the preference value of the content attribute. Moreover, a method for gradually decreasing the preference value of the content attribute when a predetermined time period elapses. The 'means for deleting' is for deleting information on the preference value having a value less than or equal to a predetermined value as a result of the decrease of the preference value by the means for decreasing. Here, even if the preference value becomes less than or equal to a predetermined value, if the storage for preference value has enough capacity in the storage area, the information on the preference value may not be deleted, and if storage for preference value does not have enough capacity, the deletion may be carried out starting with information of content attribute having the lowest preference value. The predetermined value may be set by the user himself. Other configurations are the same as those in the content viewer of any one of the first to fourth embodiments, so that descriptions are omitted.

<Concrete Configuration of Fifth Embodiment>

Figure 17:
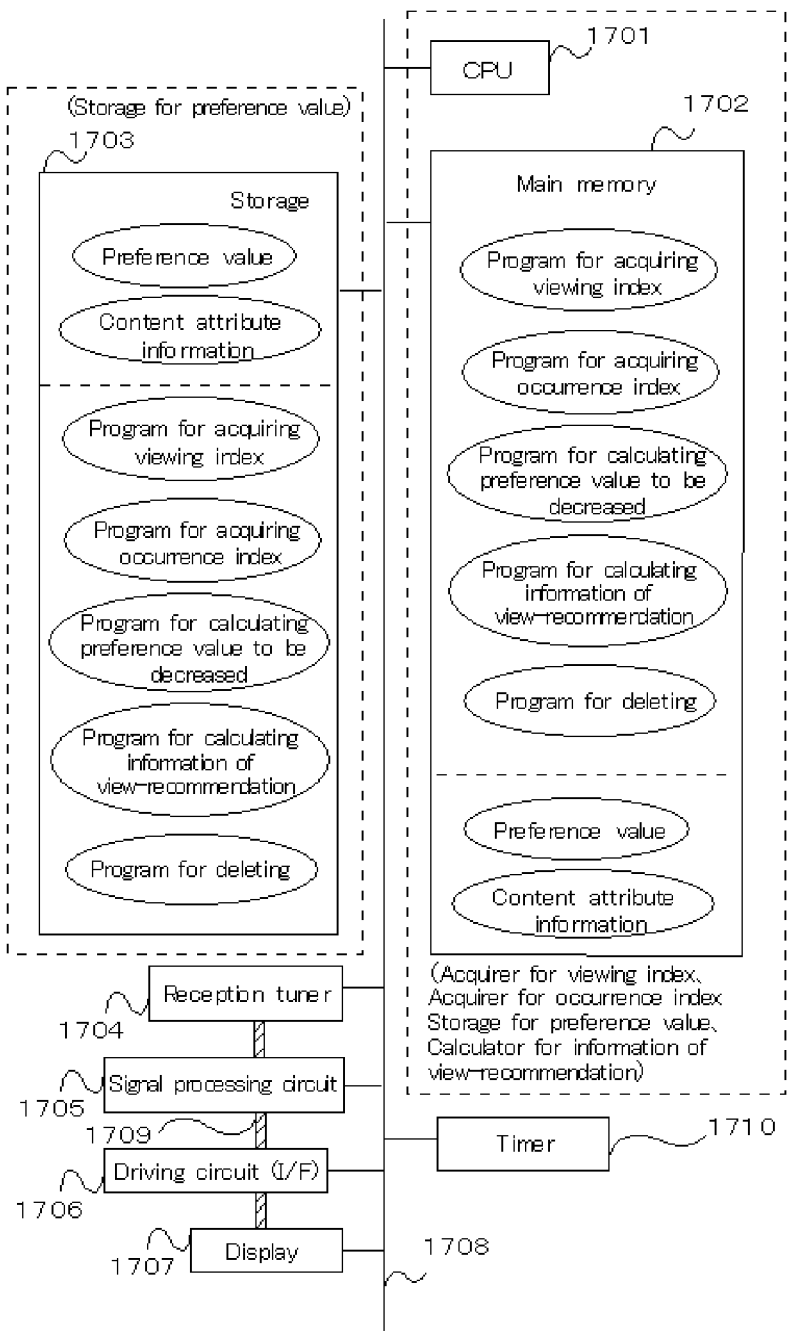
FIG. 17 is a schematic diagram showing an example of a hardware configuration of the content viewer of the fifth embodiment.

FIG. 17 is a schematic diagram showing an example of a hardware configuration of the content viewer of the fifth embodiment. The configuration is basically the same as that of the apparatus of the first embodiment described with reference to FIG. 5. However, the apparatus of the fifth embodiment has a 'timer' 1710 for measuring the passage of time from the latest viewing of the content having the content attribute associated with the preference value, and a program for calculating preference value to be decreased as one of the program for calculating preference value and a program for deleting the preference value, less than or equal to the predetermined value. When it is determined that the viewing index and the occurrence index of the content attribute stored in the storage has been updated, the program for calculating preference value to be decreased acquires the viewing index and the occurrence index of the content attribute from the storage, stores numerical data in the predetermined area in the memory, and executes calculation of normalizing the viewing index by the occurrence index. Subsequently, the program acquires the passage of time from the latest viewing of the content having the content attribute from the timer, stores the normalized value and numerical data of the passage of time in the predetermined area in the memory, executes calculation of decreasing, thereby calculating new preference value. When it is determined that the preference value of the content attribute stored in the storage has been updated, the program for deleting acquires the preference value from the storage, stores the numerical data in the predetermined area in the memory, and executes calculation for determining whether the value is less than or equal to the predetermined value. Here, when it is determined that the preference value of the content attribute is less than or equal to the predetermined value, the program for deleting deletes the information of the preference value. Other concrete configurations are the same as those of the content viewer of the first embodiment, so that descriptions are omitted.

<Processing Flow of Fifth Embodiment>

Figure 18:
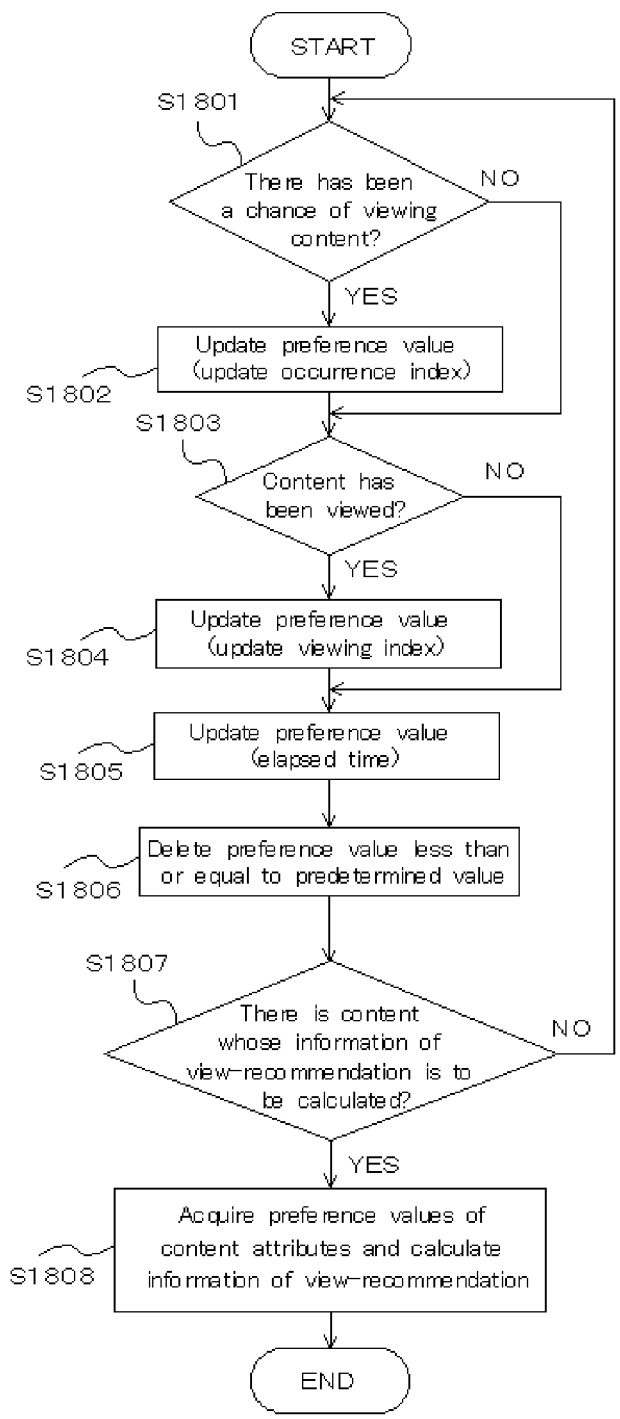
FIG. 18 is a flowchart showing processes in the content viewer of the fifth embodiment.

FIG. 18 is a flowchart showing processes in the content viewer of the fifth embodiment. In step S1805, the preference value of the content attribute is decreased based on the passage of time from the latest viewing of the content having the content attribute as a target. This processing is mainly carried out by the calculator for preference value. The information of the preference value of the content attribute having the preference value less than or equal to the predetermined value is deleted. This processing is mainly carried out by the storage for preference value. Other processes are the same as those in the content viewer of any one of the first to fourth embodiments, so that descriptions are omitted.

<Brief Description of Effects of Fifth Embodiment>

According to the content viewer of the fifth embodiment, it is possible to decrease the preference value acquired by normalizing the viewing index by the occurrence index based on the passage of time from the latest viewing of the content having the content attribute associated with the above preference value, thereby reproducing actual change of user's preference according to the passage of time. Therefore, it is possible to calculate the information of view-recommendation based on the preference value, thereby recommending the content, which has a high possibility of being viewed by the user, and better suits the user's preference.

<<Sixth Embodiment>>

<Concept of Sixth Embodiment>

A content viewer of a sixth embodiment is basically the same as that of any one of the first to fifth embodiments, and is different in that the calculator for preference value comprises means for calculating dependent on viewing time slot, calculating the preference value, so that the preference value becomes comparatively high as viewing rate of the viewing time slot of the content having the viewing index used for calculating the preference value decreases.

<Configuration of Sixth Embodiment>

Figure 19:
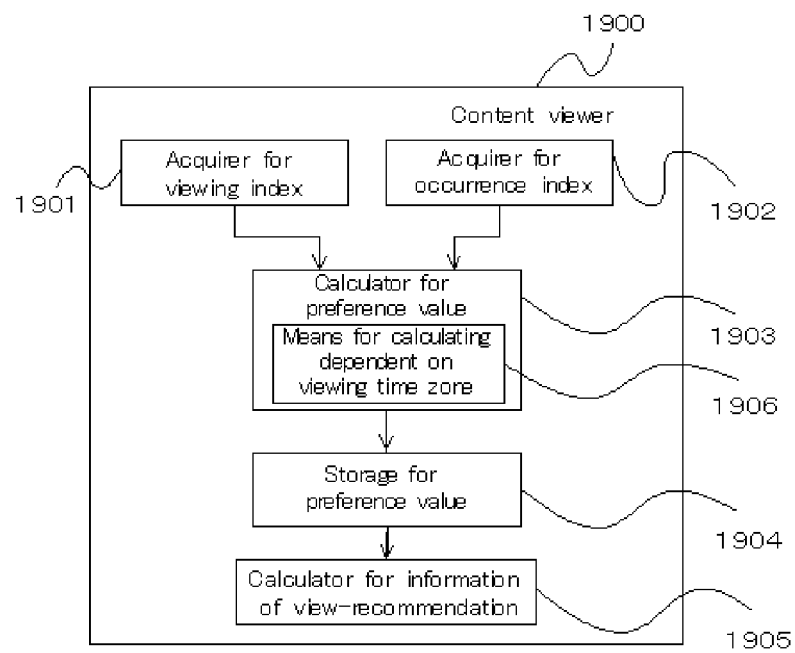
FIG. 19 is a functional block diagram of the content viewer of a sixth embodiment.

FIG. 19 is a functional block diagram of the content viewer of the sixth embodiment. A 'content viewer' 1900 of the sixth embodiment comprises an 'acquirer for viewing index' 1901, an 'acquirer for occurrence index' 1902, a 'calculator for preference value' 1903, a 'storage for preference value' 1904, and a 'calculator for information of view-recommendation' 1905, and the 'calculator for preference value' comprises 'means for calculating dependent on viewing time slot' 1906.

The 'means for calculating dependent on viewing time slot' is for calculating the preference value, so that the preference value becomes comparatively high as viewing rate of the viewing time slot of the content having the viewing index used for calculating the preference value decreases. For example, when the content has been viewed in the viewing time slot of comparatively low viewing rate, it is seemed that the user strongly wishes to view the content, so that it is possible to calculate a value, acquired by further weighting the value acquired by normalizing the viewing index by the occurrence index, as the preference value. FIG. 20 is a table for varying weight according to viewing time slot upon calculating the preference value by the content viewer of the sixth embodiment. Here, the viewing rate in the time slot 0:00-3:00 is low, so that the value, acquired by normalizing the viewing index by the occurrence index, is further multiplied by 2.0, thereby being acquired as the preference value. In the case of the time slot 12:00-15:00 or 18:00-20:00, the value, acquired by normalizing the viewing index by the occurrence index without weighting, is acquired as the preference value. Examples of the time slot to be weighted may include the time slot, in which the content is broadcast live, or the time slot, in which the content is programmed-recorded, in addition to the above time slot of viewing the content. Other configurations are the same as those in the content viewer of any one of the first to fifth embodiments, so that descriptions are omitted.

<Concrete Configuration of Sixth Embodiment>

Figure 21:
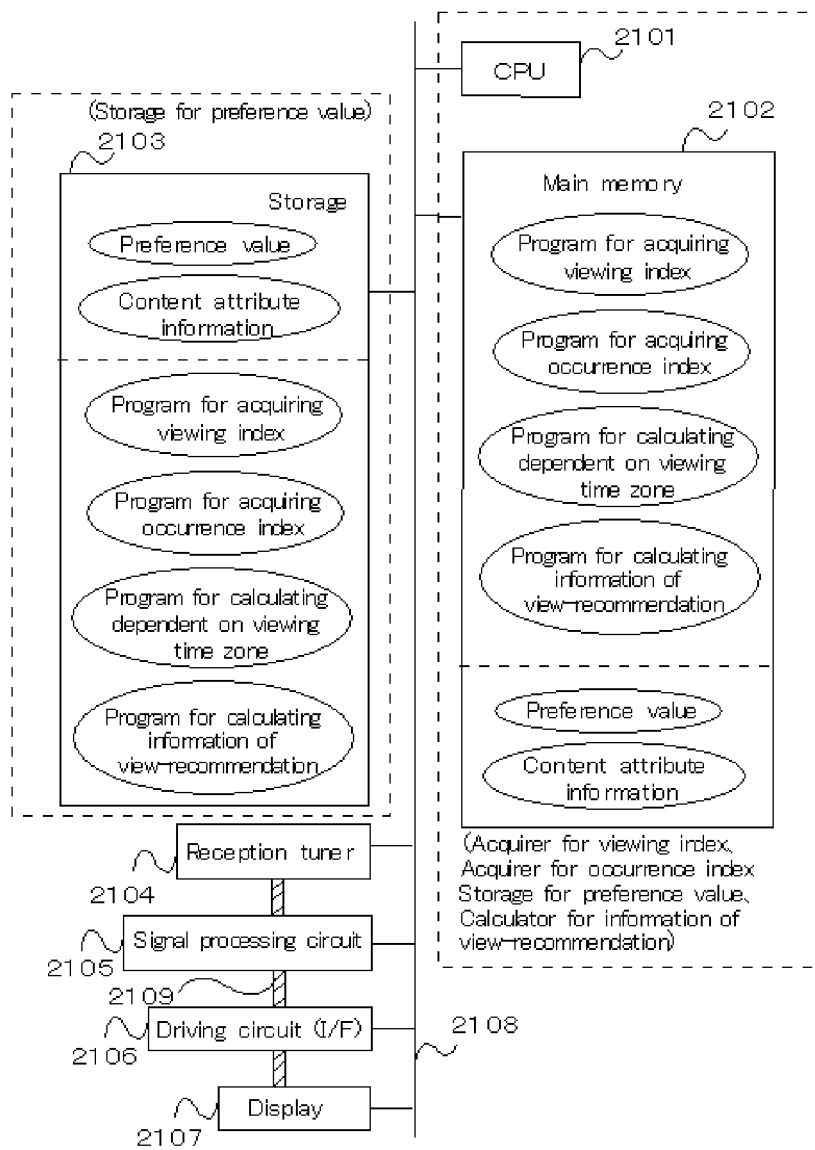
FIG. 21 is a schematic diagram showing an example of a hardware configuration of the content viewer of the sixth embodiment.

FIG. 21 is a schematic diagram showing an example of a hardware configuration of the content viewer of the sixth embodiment. The configuration is basically the same as that of the apparatus of the first embodiment described with reference to FIG. 5. However, the apparatus of the sixth embodiment has a program for calculating dependent on viewing time slot as one of the program for calculating preference value. When it is determined that the occurrence index of the content attribute stored in the storage has been updated, the program for calculating dependent on viewing time slot acquires the viewing index and the occurrence index of the content attribute from the storage, stores numerical data in the predetermined area in the memory, and executes calculation of normalizing the viewing index by the occurrence index, thereby calculating new preference value.

Moreover, when it is determined that the viewing index of the content attribute stored in the storage has been updated, the program for calculating dependent on viewing time slot acquires the viewing index and the occurrence index of the content attribute from the storage, stores numerical data in the predetermined area in the memory, and executes calculation of normalizing the viewing index by the occurrence index, thereby calculating new preference value. Subsequently, the program acquires the information of the viewing time slot of the content attribute from the storage, stores numerical data indicating the information and the normalized value in the predetermined area in the memory, and executes calculation, thereby calculating new preference value. Other concrete configurations are the same as those of the content viewer of the first embodiment, so that descriptions are omitted.

<Processing Flow of Sixth Embodiment>

Figure 22:
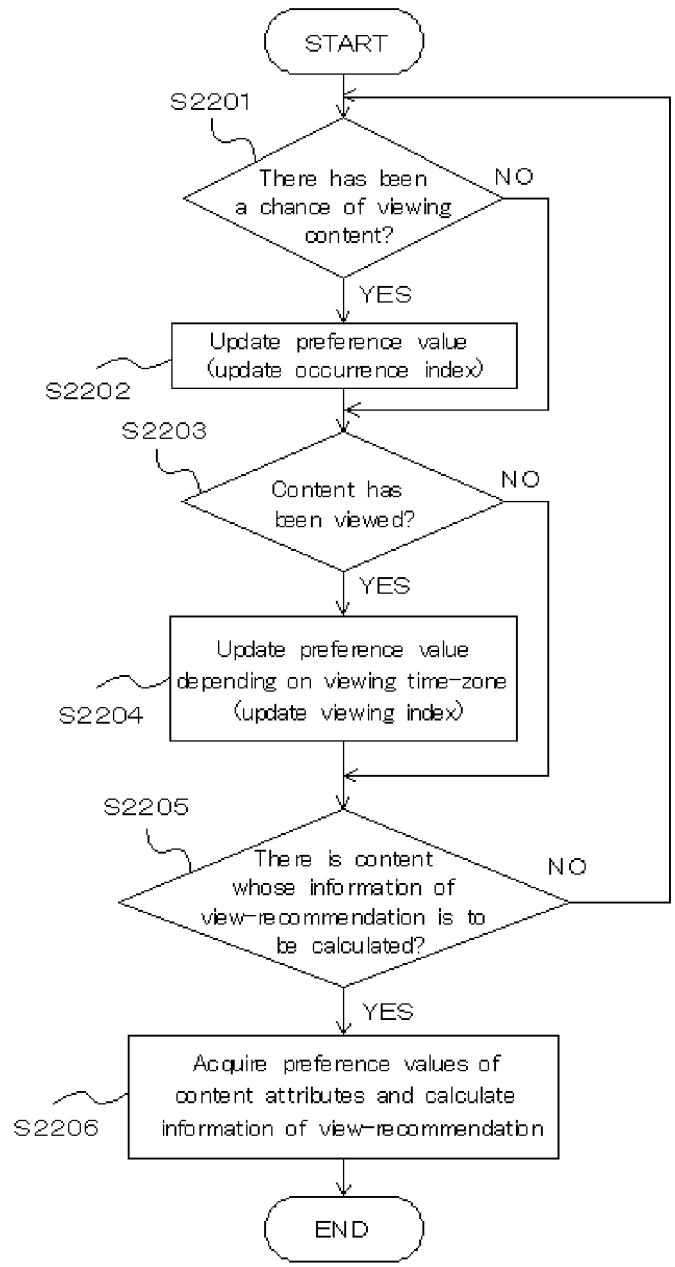
FIG. 22 is a flowchart showing processes in the content viewer of the sixth embodiment.

FIG. 22 is a flowchart showing processes in the content viewer of the sixth embodiment. In step S2204, calculation of the preference value is executed, so that the preference value becomes comparatively high as viewing rate of the viewing time slot of the content decreases. This processing is mainly carried out by the storage for preference value. Other processes are the same as those in the content viewer of any one of the first to fifth embodiments, so that descriptions are omitted.

<Brief Description of Effects of Sixth Embodiment>

According to the content viewer of the sixth embodiment, it is possible to execute calculation, so that the preference value becomes comparatively high by weighting as viewing rate of the viewing time slot of the content decreases, thereby acquiring the preference value dependent on the viewing time slot. It is possible to calculate the information of view-recommendation based on the above preference value, thereby recommending the content, which has high possibility of being viewed by the user, and better suits the user's preference.

<<Seventh Embodiment>>

<Concept of Seventh Embodiment>

A content viewer of a seventh embodiment is basically the same as that of any one of the first to sixth embodiments, and is different in further comprising an editor for editing the information stored in the storage for preference value.

<Configuration of Seventh Embodiment>

Figure 23:
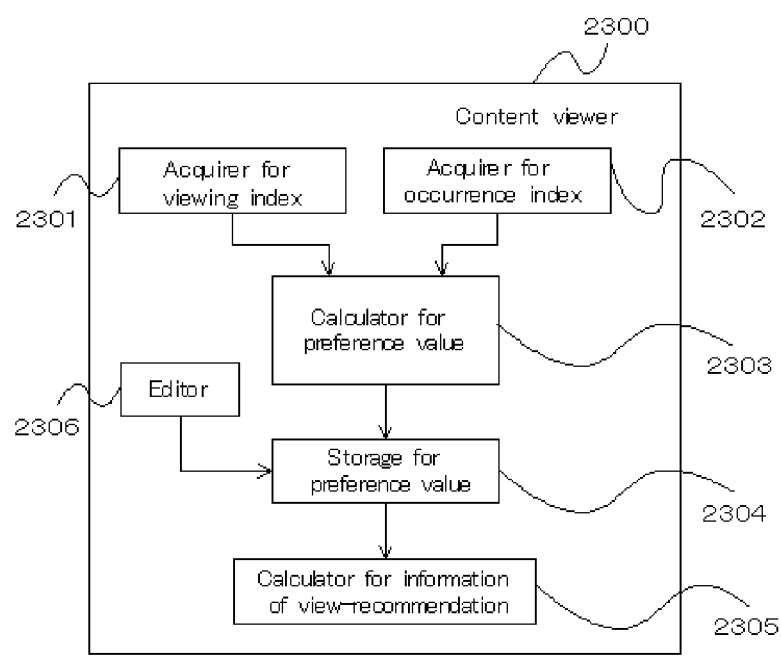
FIG. 23 is a functional block diagram of the content viewer of a seventh embodiment.

FIG. 23 is a functional block diagram of the content viewer of the seventh embodiment. A 'content viewer' 2300 of the seventh embodiment comprises an 'acquirer for viewing index' 2301, an 'acquirer for occurrence index' 2302, a 'calculator for preference value' 2303, a 'storage for preference value' 2304, and a 'calculator for information of view-recommendation' 2305, and an 'editor' 2306.

The 'editor' is configured to edit the information stored in the storage for preference value. For example, it is possible for the user to edit the preference value according to his preference, or to edit the viewing index or the occurrence index when the viewing index and the occurrence index are stored in the storage for preference value. Specifically, when the user has missed the content, which the user desired to view, the viewing index of the content attribute associated with the content is not added, but the occurrence index is added, so that the preference value decreases. In such case, the user can edit the preference value etc. of the content attribute (e.g., content title, cast or genre), which have been motivation for the user to view the content, ex-post facto, so that the preference value suits the user's preference. Moreover, the user can preliminarily edit the preference value of each content attribute, so that the preference value suits the user's preference, thereby calculating the information of view-recommendation based on the above information of preference value. Furthermore, it is possible to delete the information of preference value, which is unnecessary to be stored in the storage for preference value, or to add the information of preference value, which is desired to be stored in the storage for preference value. Other configurations are the same as those in the content viewer of any one of the first to sixth embodiments, so that descriptions are omitted.

<Concrete Configuration of Seventh Embodiment>

Figure 24:
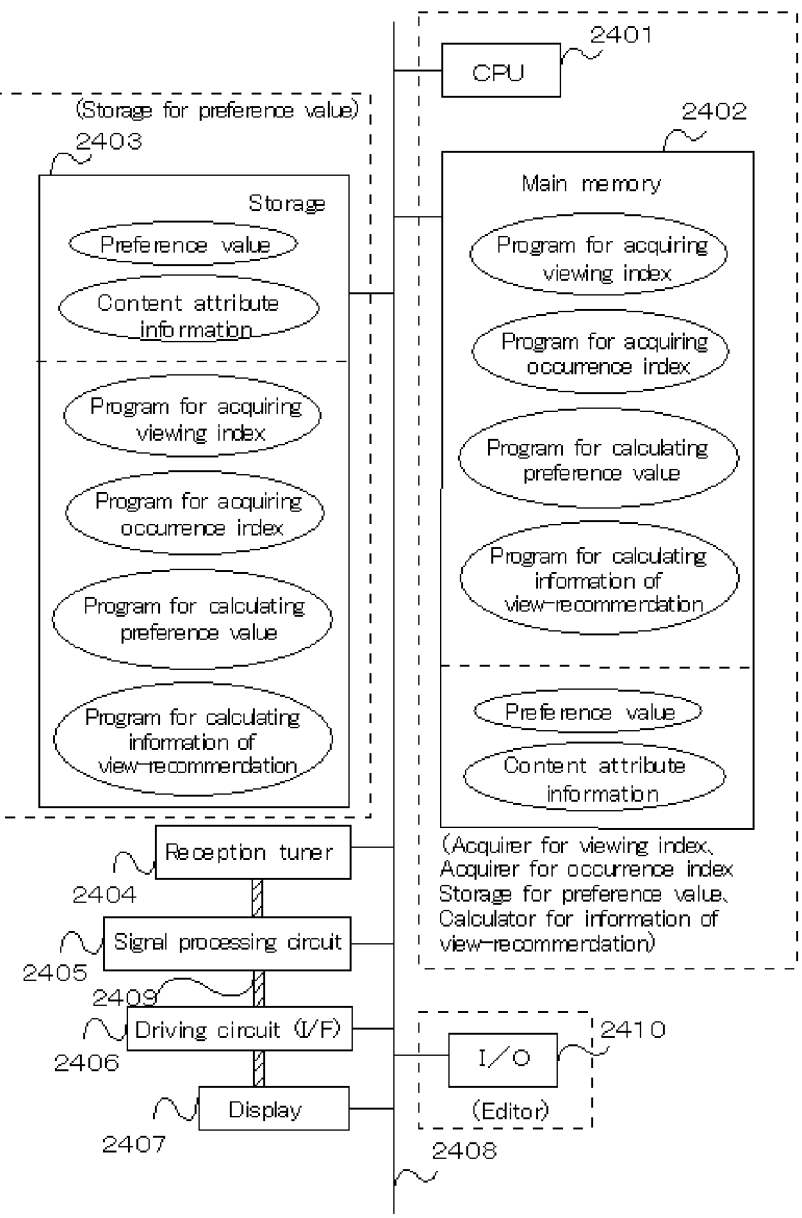
FIG. 24 is a schematic diagram showing an example of a hardware configuration of the content viewer of the seventh embodiment.

FIG. 24 is a schematic diagram showing an example of a hardware configuration of the content viewer of the seventh embodiment. The configuration is basically the same as that of the apparatus of the first embodiment described with reference to FIG. 5. However, the apparatus of the fourth embodiment comprises an 'I/O' 2410 as the editor. The user can execute an operation for editing through the I/O, information of the operation as edit signal is transmitted to the storage, thereby updating the information of preference value stored in the storage. Other concrete configurations are the same as those of the content viewer of the first embodiment, so that descriptions are omitted.

<Processing Flow of Seventh Embodiment>

Figure 25:
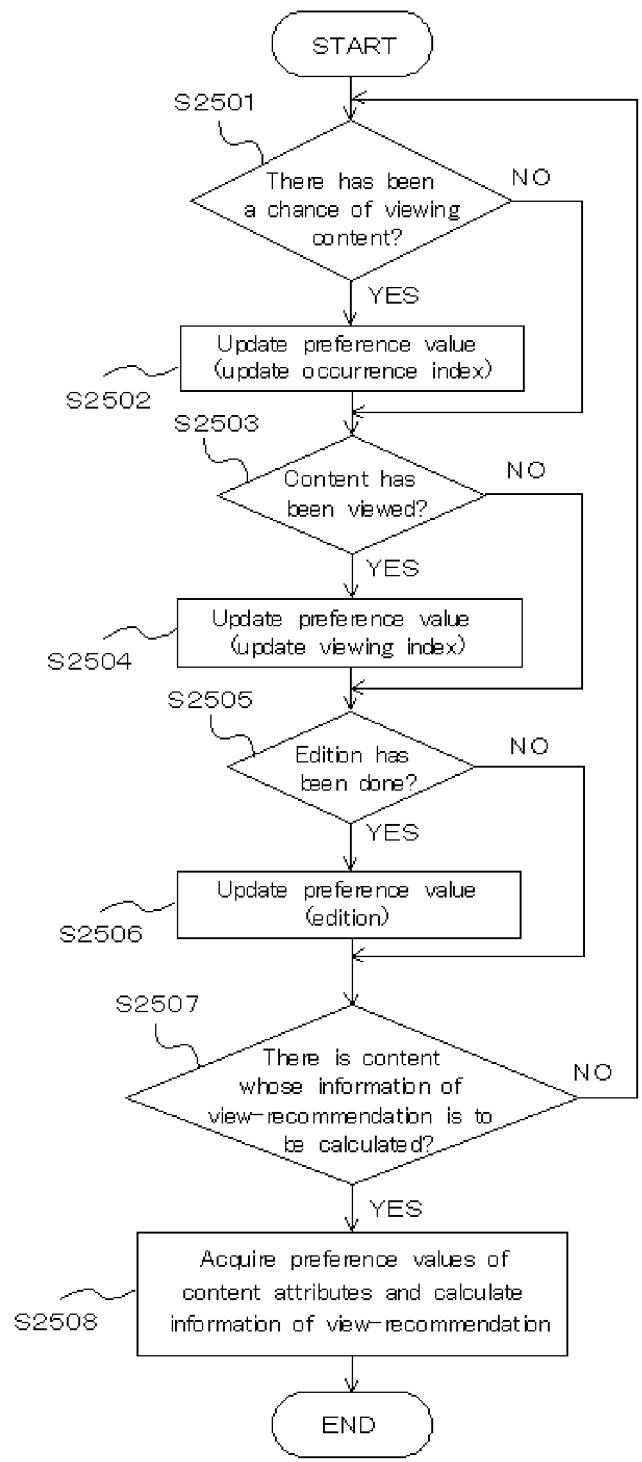
FIG. 25 is a flowchart showing processes in the content viewer of the seventh embodiment.

FIG. 25 is a flowchart showing processes in the content viewer of the seventh embodiment. In step S2505, it is determined whether there has been the edit operation for the information of preference value stored in the storage for preference value. Here, if it is determined that there has not been the operation, step S2507 is carried out. If it is determined that there has been the operation, step S2506 is carried out. In step S2506, he information of preference value is updated in accordance with the edit operation. Other processes are the same as those in the content viewer of any one of the first to sixth embodiments, so that descriptions are omitted. This processing is mainly carried out by the editor.

<Brief Description of Effects of Seventh Embodiment>

According to the content viewer of the seventh embodiment, it is possible to further edit the preference value so as to suit for the user's preference. Therefore, it is possible to calculate the information of view-recommendation based on the above preference value, thereby recommending the content, which has high possibility of being viewed by the user, and better suits the user's preference.

What is claimed is:

1. A content viewer, comprising:
an acquirer for viewing index, acquiring a viewing index, on a per-user basis, indicating frequency of viewing content;
an acquirer for occurrence index, acquiring an occurrence index indicating frequency of chances for viewing the content;
a calculator for preference value, calculating a preference value, on a per-user basis, acquired by further weighting the value acquired by normalizing the viewing index by the occurrence index with respect to each content attribute;
a storage for preference value, associating the calculated preference value with the content attribute, and storing the preference value associated with the content attribute; and
a calculator for information of view-recommendation, acquiring the content attribute associated with a content as a target in order to recommend viewing the content, acquiring the preference value stored in the storage for preference value by utilizing the content attribute as a key, and calculating information of view-recommendation by utilizing the acquired preference value.

2. The content viewer according to claim 1, comprising:
a display for list, displaying a list of viewable contents,
wherein the acquirer for occurrence index further comprises
means for acquiring number of displays of the list, which is number of displays of content ID, by the display for list as number of chances of viewing.

3. The content viewer according to claim 1,
wherein the acquirer for occurrence index further comprises
means for acquiring number of calculations of the information of view-recommendation the content by the calculator for information of view-recommendation as number of chances of viewing.

4. The content viewer according to claim 1, comprising:
an acquirer for history of user's operations, acquiring a history of user's operations for viewing,
wherein the acquirer for viewing index further comprises,
means for calculating the viewing index based on the acquired history of user's operations.

5. The content viewer according to claim 1,
wherein the calculator for preference value further comprises
means for decreasing the preference value with passage of time from the latest viewing of the content having the content attribute associated with the preference value upon calculating the preference value, and
the storage for preference value comprises
means for deleting information on the preference value having a value less than or equal to a predetermined value as a result of the decrease of the preference value by the means for decreasing.

6. The content viewer according to claim 1,
wherein the
means for calculating dependent on viewing time slot, calculating the preference value, so that the preference value becomes comparatively high as viewing rate of the viewing time slot of the content having the viewing index used for calculating the preference value decreases.

7. The content viewer according to claim 1, further comprising:
an editor, editing the information stored in the storage for preference value.

8. A method for recommending content, comprising the steps of:
acquiring a viewing index, on a per-user basis, indicating frequency of viewing content;
acquiring an occurrence index indicating frequency of chances for viewing the content;
calculating a preference value, on a per-user basis, acquired by further weighting the value acquired by normalizing the viewing index by the occurrence index with respect to each content attribute;
associating the calculated preference value with the content attribute, and storing the preference value associated with the content attribute; and
acquiring the content attribute associated with a content as a target in order to recommend viewing the content, acquiring the preference value stored in the storage for preference value by utilizing the content attribute as a key, and calculating information of view-recommendation by utilizing the acquired preference value.

9. The content viewer according to claim 2,
wherein the acquirer for occurrence index further comprises means for acquiring number of calculations of the information of view-recommendation the content by the calculator for information of view-recommendation as number of chances of viewing.

10. The content viewer according to claim 2, comprising:
an acquirer for history of user's operations, acquiring a history of user's operations for viewing,
wherein the acquirer for viewing index further comprises,
means for calculating the viewing index based on the acquired history of user's operations.

11. The content viewer according to claim 3, comprising:
an acquirer for history of user's operations, acquiring a history of user's operations for viewing,
wherein the acquirer for viewing index further comprises,
means for calculating the viewing index based on the acquired history of user's operations.

12. The content viewer according to claim 2,
wherein the calculator for preference value further comprises
means for decreasing the preference value with passage of time from the latest viewing of the content having the content attribute associated with the preference value upon calculating the preference value, and
the storage for preference value comprises
means for deleting information on the preference value having a value less than or equal to a predetermined value as a result of the decrease of the preference value by the means for decreasing.

13. The content viewer according to claim 3,
wherein the calculator for preference value further comprises
means for decreasing the preference value with passage of time from the latest viewing of the content having the content attribute associated with the preference value upon calculating the preference value, and
the storage for preference value comprises
means for deleting information on the preference value having a value less than or equal to a predetermined value as a result of the decrease of the preference value by the means for decreasing.

14. The content viewer according to claim 4,
wherein the calculator for preference value further comprises
means for decreasing the preference value with passage of time from the latest viewing of the content having the content attribute associated with the preference value upon calculating the preference value, and
the storage for preference value comprises
means for deleting information on the preference value having a value less than or equal to a predetermined value as a result of the decrease of the preference value by the means for decreasing.

15. The content viewer according to claim 2,
wherein the
means for calculating dependent on viewing time slot, calculating the preference value, so that the preference value becomes comparatively high as viewing rate of the viewing time slot of the content having the viewing index used for calculating the preference value decreases.

16. The content viewer according to claim 3,
wherein the
means for calculating dependent on viewing time slot, calculating the preference value, so that the preference value becomes comparatively high as viewing rate of the viewing time slot of the content having the viewing index used for calculating the preference value decreases.

17. The content viewer according to claim 4,
wherein the
means for calculating dependent on viewing time slot, calculating the preference value, so that the preference value becomes comparatively high as viewing rate of the viewing time slot of the content having the viewing index used for calculating the preference value decreases.

18. The content viewer according to claim 5,
wherein the
means for calculating dependent on viewing time slot, calculating the preference value, so that the preference value becomes comparatively high as viewing rate of the viewing time slot of the content having the viewing index used for calculating the preference value decreases.

19. The content viewer according to claim 2, further comprising:
an editor, editing the information stored in the storage for preference value.

20. The content viewer according to claim 3, further comprising:
an editor, editing the information stored in the storage for preference value.

* * * * *